Dec. 3, 1935.  F. F. BRUCKER  2,023,264
METHOD OF MAKING COMPOSITE ARTICLES
Filed Feb. 4, 1932
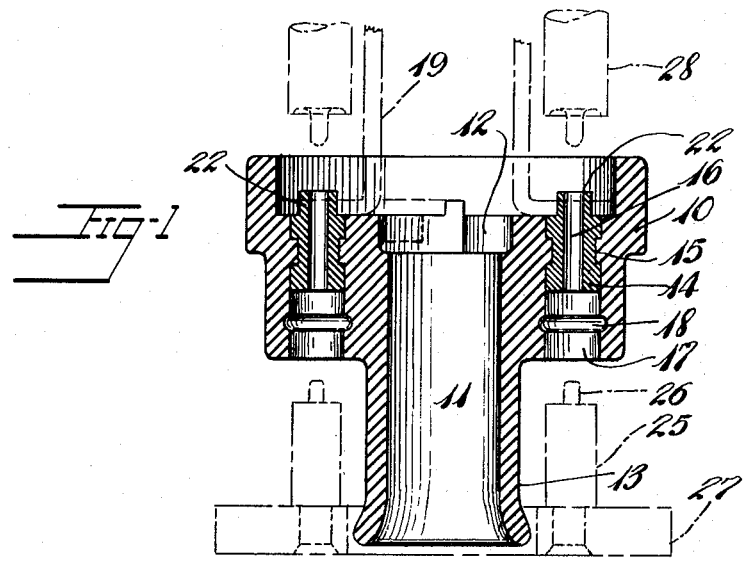
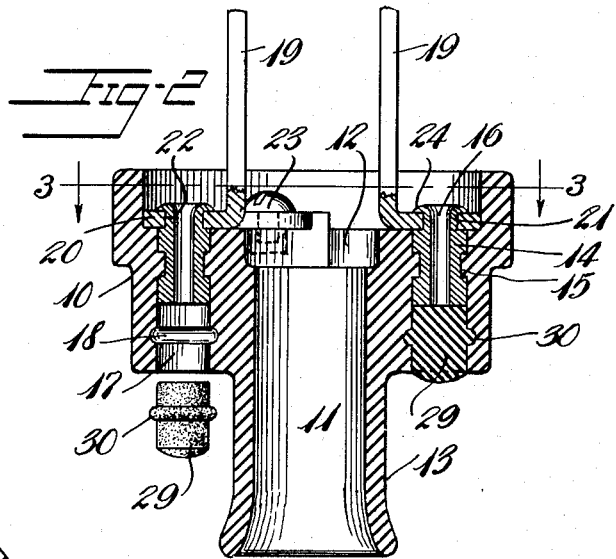
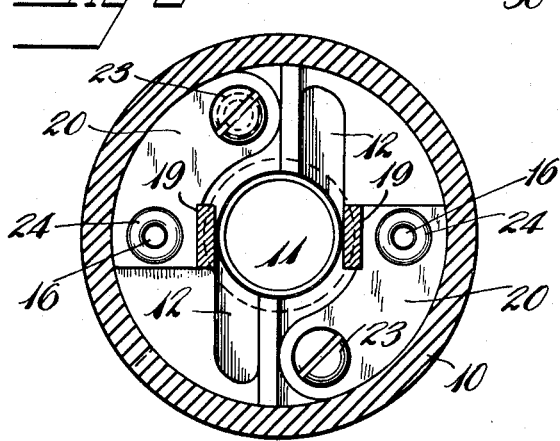
Inventor
Ferdinand F. Brucker
By Eakin & Avery
Attys.

Patented Dec. 3, 1935

2,023,264

UNITED STATES PATENT OFFICE 2,023,264

METHOD OF MAKING COMPOSITE ARTICLES

Ferdinand F. Brucker, Akron, Ohio, assignor to The B. F. Goodrich Company, New York, N. Y., a corporation of New York Application February 4, 1932, Serial No. 590,805

5 Claims. (Cl. 29—155.5)

This invention relates to a composite article formed of plastic material and metal and to a method of making the same. The invention is especially useful in the manufacture of articles such as electrical apparatus in which it is desired to provide metallic parts united to parts formed of molded insulating material.

The principal objects of the invention are to provide for secure attachment of the parts of the article to each other, to provide against tarnishing of the metal parts during manufacture, to provide against breakage during manufacture and to provide simplicity and efficiency in structure.

Other objects will appear from the following description and the accompanying drawing.

In the drawing, in which, by way of example, I have illustrated an electrical attachment plug and its method of manufacture.

Fig. 1 is a central cross-sectional view of an attachment plug showing in dotted lines the contact blades and the tools for attaching them to the other parts.

Fig. 2 is a similar view showing the contact blades in place and the insulating plugs, one of the plugs being inserted and the other ready to insert.

Fig. 3 is a cross sectional view on line 3—3 of Fig. 2.

Referring to the drawing, the numeral 10 designates the body of an attachment plug which may be molded from plastic insulating material to provide a body of flexible material, but preferably of soft rubber. This body may be formed with a passage 11 therethrough to afford a passage for insulated wires and with recesses 12 for holding the wires. A tubular handle 13 may also be provided to assist in inserting or withdrawing the plug. Inserts 14, of soft metal are partially enclosed in the body 10 during the molding thereof and may be adherently attached to the plastic material by any of the well known processes. Where the body 10 is formed of soft rubber, the inserts 14 may be made of a brass composition or may be electroplated with a brass composition to which the rubber will be firmly attached by vulcanization.

The inserts 14 may be grooved as at 15 to interlock with the plastic material and afford an increased adhesive surface.

In order to facilitate accurate location of the inserts 14 in the body 10, the inserts are provided with central longitudinal passages 16 which fit over shouldered supporting pins provided in the mold which forms the body portion. Such pins form openings 17 through the body below the inserts 14 and are preferably so formed as to provide annular grooves 18 in said openings where the body is to be formed of soft rubber.

It is well known that where metal parts are heated in contact with plastics such as rubber, as during vulcanization of the rubber thereto, the metal parts become oxidized or tarnished by combining with sulfur or other chemicals present in the plastic material. It is also well known that such oxidized or tarnished surfaces are not electrically efficient as conductors. In order to avoid the presence of oxides or sulfides on the surfaces of the metal parts I provide separate current conducting parts and attach these to the metal inserts embedded in the body portion after the forming of the body portion is complete.

In the attachment plug shown as an example, the contact blades 19 are provided with integral current conducting bases 20 adapted to be seated on the body 10 and provided with openings 21 which embrace reduced ends 22 of inserts 14. Bases 20 are also provided with threaded openings for receiving conductor-clamping screws 23. The reduced ends 22 of the inserts are upset as at 24 by riveting or spinning so as to permanently retain the blades in place.

Where the base 10 is made of brittle material, the riveting of contact blades or other metallic members to inserts supported only by the base is conducive of cracking of the base and where the base is made of resilient material such as soft rubber it is impossible to rivet to an insert supported on such resilient material. In order to obviate these difficulties I form the base with the openings 17 in line with the inserts 14 and of sufficient size to admit supporting anvil members 25 provided with dowels 26. The anvil members are firmly supported in a die block 27 mounted in a punch press or other pressure device where punches 28 mounted in line with the anvil members, may be used to upset the tubular rivet extensions of inserts 14 without producing distorting stresses in the base 10.

After the contact blades have been attached openings 17 may be closed by filling plugs 29 of soft rubber. These plugs may be beaded as at 30 to interlock with grooves 18 and may if desired be coated with cement before being put in place. The closing of opening 17 prevents electrical contact being made with inserts 14 from the back of the plug.

The insert supporting pins in the mold correspond to the anvil members 25 and where desired the blades may be riveted to the inserts while the same are in the forming mold after the plastic parts have been molded therein.

I claim:

1. The method of making a composite article of metal and moldable plastic material which comprises molding a resilient body from plastic material and simultaneously embedding a metal insert therein and forming an opening back of said insert, and supporting said insert through said opening while attaching a metal part thereto by pressure applied through said insert without subjecting the body to pressure.

2. The method of making a composite article of metal and moldable plastic material which comprises supporting a metal insert in a mold, molding a resilient body of plastic material thereabout, removing the article so formed from the mold, and supporting the insert through an opening in the body while attaching a metal part thereto without subjecting the body to pressure.

3. The method of making a composite article of rubber and metal which comprises supporting a metal insert in a mold, forming and vulcanizing a resilient rubber body around said insert and attaching a metal part to said insert by pressing dies one of which directly supports the insert through an opening in said body without subjecting the body to pressure.

4. The method of making an attachment plug which comprises supporting a plurality of metal inserts in a mold, forming a body of soft, vulcanized rubber thereabout, and riveting a metal contact blade to each insert while directly supporting the insert through an opening in said body without subjecting the body to pressure.

5. The method of making a composite article which comprises forming a resilient body of plastic rubber compound around a metal insert while supporting said insert on a pin passing through said body, and riveting a metal part to a projecting portion of said insert while said insert is so supported without subjecting the body to pressure.

FERDINAND F. BRUCKER.